United States Patent [19]

Lawson

[11] Patent Number: 4,945,287
[45] Date of Patent: Jul. 31, 1990

[54] MULTIPLE PENTAPRISM SCANNING DEVICE AND METHOD

[75] Inventor: John A. Lawson, Centerville, Ohio

[73] Assignee: Eotron Corporation, Dayton, Ohio

[21] Appl. No.: 205,993

[22] Filed: Jun. 13, 1988

[51] Int. Cl.⁵ .............................................. H01U 3/14
[52] U.S. Cl. ..................................... 250/236; 350/6.4
[58] Field of Search ................. 350/6.4; 358/206, 293; 250/234–236

[56] References Cited

U.S. PATENT DOCUMENTS

| | | | |
|---|---|---|---|
| 3,471,236 | 10/1969 | Pearson | 356/24 |
| 3,817,593 | 6/1974 | Harris et al. | 350/6.9 |
| 3,828,124 | 8/1974 | Baum | 350/6.4 |
| 3,875,587 | 4/1975 | Pugsley | 346/165 |
| 3,966,328 | 6/1976 | Wiklund | 356/138 |
| 4,002,830 | 1/1977 | Brown et al. | 358/293 |
| 4,170,028 | 10/1979 | DeBenedictis et al. | 358/285 |
| 4,268,110 | 5/1981 | Ford | 350/6.7 |
| 4,304,459 | 12/1981 | Kramer | 358/285 |
| 4,319,807 | 3/1982 | Horton | 350/6.4 |
| 4,321,700 | 3/1982 | Russell | 350/3.71 |
| 4,363,539 | 12/1982 | Gerber | 354/4 |
| 4,433,894 | 2/1984 | Hanson et al. | 350/6.8 |
| 4,468,119 | 8/1984 | Hammer | 356/152 |
| 4,475,787 | 10/1984 | Starkweather | 350/6.4 |
| 4,544,228 | 10/1985 | Rando | 350/6.4 |
| 4,606,601 | 8/1986 | Starkweather | 350/6.4 |
| 4,768,184 | 8/1988 | Reno | 350/6.4 |

Primary Examiner—David C. Nelms
Attorney, Agent, or Firm—Killworth, Gottman, Hagan & Schaeff

[57] ABSTRACT

A scanning device for causing a beam of light to be repetitively swept across a surface includes a laser source for providing a beam of laser light and a pentaprism assembly which redirects the beam of light to the surface. The pentaprism assembly includes a support member and a plurality of pentaprism elements positioned around the periphery of the support member. An arrangement is provided for rotating the support member such that successive ones of the plurality of pentaprism elements are brought into the path of the beam of light and redirect the beam of light to the surface. Movement of each pentaprism element while intersecting the beam of light causes the beam of light to sweep across the surface. The scanning device may also be used without a laser source to scan ambient light which is reflected from a surface and direct the light to a detector.

24 Claims, 7 Drawing Sheets

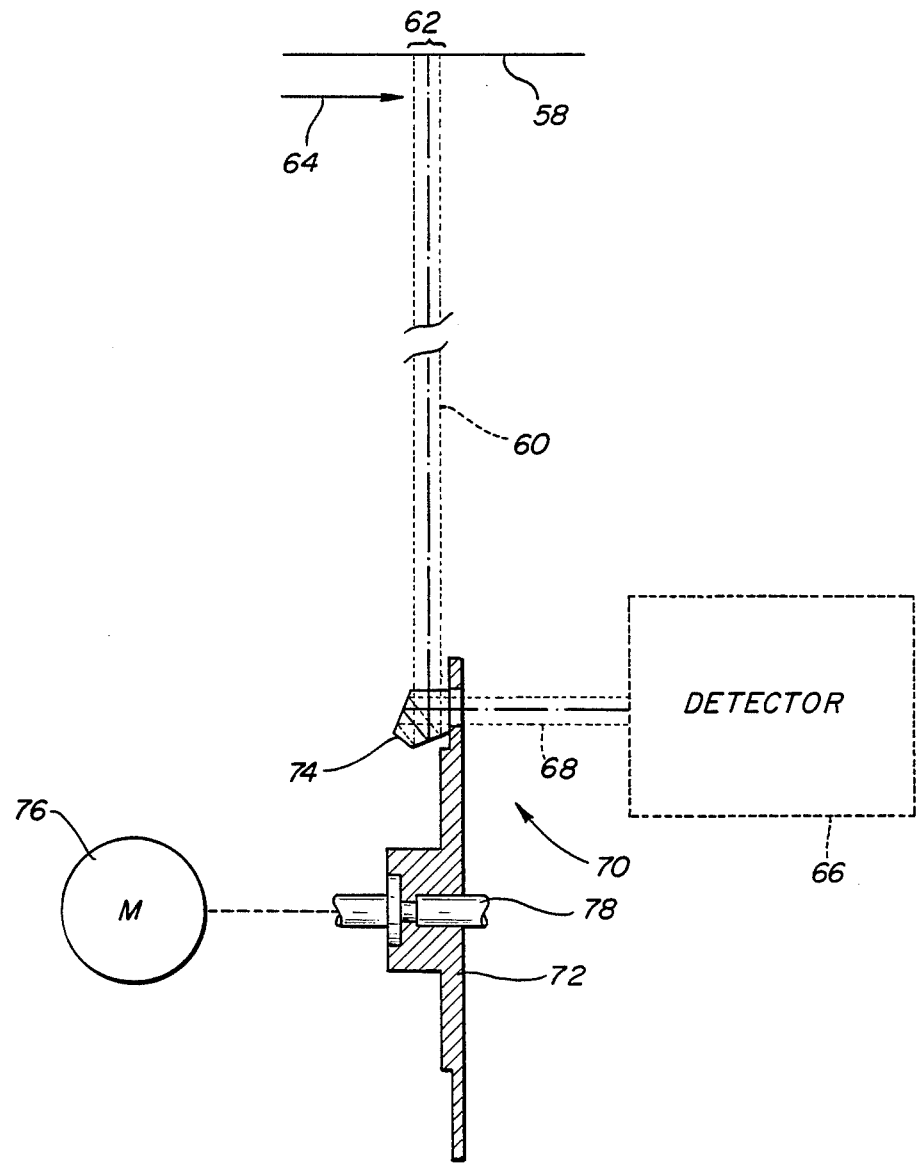

MULTIPLE PENTAPRISM SCANNING DEVICE AND METHOD

BACKGROUND OF THE INVENTION

The present invention relates to a scanning device and a scanning method for causing a beam of light to sweep across a surface and, more particularly, to such a device and method in which the beam is swept in succession along a plurality of generally parallel scan lines which are spaced apart on the surface.

Optical scanning devices for directing a beam of light to sweep across a surface are used in various applications. For example, color scanners are known which, by means of photoelectric sensors and color filters, analyze a color photograph on a point by point basis to produce a color component electrical signal for each of a series of color separations. The signal is used to control the exposure of a photographic film which forms the color separation. The film is exposed, point by point, to light which is modulated in accordance with the color component electrical signal such that the color separation reflects the color component density at the scanned points on the original photograph.

Similar scanning is utilized to reproduce original images or paste-up images on printing or photographic plates for single color reproduction. Additionally, optical scanning by sweeping a beam of light across a surface is utilized in facsimile and character recognition systems.

In known scanners, a beam of light, such as for example a beam of laser light, is produced by a stationary light source. A moving beam deflector device, positioned in the path of the laser beam, diverts the beam to the surface which is to be scanned. The moving beam deflector device may for example comprise a mirror or prism arrangement which is rotated, thus causing the beam to sweep across the surface along a scan line or path. Relative movement between the beam diverting device and the surface to be scanned is accomplished such that successive sweeps of the beam are made along a series of spaced scan lines on the surface.

Imperfections in the beam diverting device and its bearing supports may, however, introduce errors in the path of the deflected beam, thus resulting in improperly positioned scan lines. A number of different approaches to eliminating or reducing such errors have been taken in prior art scanning devices. One such approach is incorporated into a scanning device disclosed in U.S. Pat. No. 4,002,830, issued Jan. 11, 1977 to Brown et al, which scans by means of a rotating polygonal mirror. A beam is directed to the rotating polygonal mirror by a reflecting element which is adjusted in position by a servo control system. The position of the reflecting element is altered to correct for variations in the angles between the facets of the rotating polygonal mirror. The Brown et al scanning device cannot however, correct for errors induced by other factors, such as bearing wobble.

A somewhat similar correction arrangement is shown in U.S. Pat. No. 4,268,110, issued May 19, 1981, to Ford. In the Ford scanner, a multi-faceted rotating optical scanning element deflects light from a laser source to a surface to be scanned. Associated with each facet of the element is a transparent correction element which defines a slight wedge angle between its two surfaces. By adjusting the orientation of each of the correction elements, errors in the angular orientations of the facets may be compensated. The Ford correction arrangement, however, is not capable of compensating for errors induced by bearing wobble.

Other prior art scanners correct for scanning element wobble by utilizing a rotating pentaprism as the scanner element. Light directed to the pentaprism is reflected at a constant angle, typically 90°, regardless of small changes in the orientation of the pentaprism. Rotating the pentaprism about an axis aligned with the incident beam of light produces a rotating beam which can scan across a surface. If the pentaprism wobbles during this rotation there is no effect of such wobble on the angle of exit of a scanned beam from the pentaprism because of the reflection pattern of the light within the prism. U.S. Pat. No. 3,875,587, issued Apr. 1, 1975, to Pugsley, discloses such a scanning system.

While the use of a rotating pentaprism does compensate for wobble, nevertheless the scanning operation which can be accomplished using a single pentaprism is somewhat limited. If a pentaprism is continuously rotated at a uniform rate, it can either be used to scan a surface only during a limited portion of each rotation, thereby reducing appreciably the number of lines which can be scanned per unit time, or the surface to be scanned must be wrapped around the pentaprism, thereby limiting the type of surface which can be scanned, and its dimensions. If the pentaprism is not rotated continuously, but rather is cyclically rotated only through a limited angle and then returned to its original position, problems may be encountered in accomplishing this quickly and accurately due to the mass of the pentaprism.

It is seen, therefore, that there is a need for a simple, accurate optical scanning system and method for deflecting a beam of light to scan across a surface in a rapid, efficient manner.

SUMMARY OF THE INVENTION

A scanning device for causing a beam of light to be repetitively swept across a surface includes means for providing a beam of light, a pentaprism assembly means including a support member and a plurality of pentaprism elements positioned around the periphery of the support member, and means for rotating the support member. The pentaprism assembly means redirects the beam of light to the surface. Successive ones of the plurality of pentaprism elements are brought into the path of the beam of light and redirect the beam of light to the surface. Movement of each pentaprism element while intersecting the beam of light causes the beam of light to sweep across the surface.

The beam of light may be provided by a laser source. The means for rotating the support member may comprise means for rotating the support member about an axis which is generally parallel to, but not aligned with, the beam of light. The pentaprism elements are mounted on the support member so as to redirect the beam of light outward in a direction generally perpendicular to the axis of rotation of the support member, whereby movement of each pentaprism element through the path of the beam causes the beam to strike the surface and sweep along a path on the surface.

The scanning device may further include means for moving the pentaprism assembly means in a direction generally parallel with the surface. As a consequence, the movement of successive pentaprism elements through the path of the beam causes the beam to sweep in succession along generally parallel, spaced paths on the surface. This produces scanning of the surface by the beam in a raster format. The pentaprism element may be elongated and mounted on the support member periphery so as to intersect the beam during a portion of each revolution of the support member. A lens means may be provided for focusing light which is redirected by the pentaprism elements on the surface. The surface may be a planar surface with the lens means comprising a multiple element FO lens arrangement.

A scanning method for directing a beam of light to a surface may comprise the steps of:

(a) providing a beam of light, and (b) rotating at least one pentaprism element about an axis which is not aligned with the pentaprism element, intercepting the beam and redirecting the beam to scan across the surface.

The scanning method may further comprise the step of focusing the beam on a surface after redirection by the pentaprism element. The step of rotating may include the step of rotating the pentaprism element about an axis generally parallel with the surface. The step of providing a beam of light may include the step of providing a beam of light which is generally parallel to the surface.

The step of rotating may include the step of rotating a plurality of pentaprism elements about an axis which is not aligned with the pentaprism elements and from which the elements are spaced by substantially equal distances. The step of providing a beam of light might include the step of providing a collimated beam of coherent light.

A scanning device for receiving light from an area on a distant surface, which area is repetitively swept across the surface, comprises a detector means for providing an electrical signal in response to light incident thereon, and a pentaprism assembly means for receiving substantially collimated light from an area on a distant surface and redirecting the collimated light to the detector means. The pentaprism assembly means includes a support member and a plurality of pentaprism elements positioned around the periphery of the support member. A means is provided for rotating the support member such that successive ones of the plurality of pentaprism elements are brought into optical alignment with detector means. This redirects the collimated light to the detector means, whereby movement of each pentaprism element while aligned with the detector means causes the area to sweep across the surface.

The pentaprism elements are mounted on the support member so as to redirect the collimated light in a direction generally parallel to the axis of rotation of the support member, whereby movement of each pentaprism element causes the area to sweep along a path on the surface.

A means is provided for moving the pentaprism assembly means in a direction generally parallel with the surface, whereby the movement of successive pentaprism elements into alignment with the detector means causes the area to sweep in succession along generally parallel, off-set paths on the surface, thereby producing raster scanning of the surface. Each pentaprism element is elongated and mounted on the support member periphery so as to align with the detector means during a portion of each revolution of the support member.

Accordingly it is an object of the present invention to provide a device and method for causing a beam of light to be repetitively swept across a surface in which the beam may be repetitively scanned across the surface in a precisely controlled manner to provide such a device and method in which a rotating beam deflector intercepts a beam and redirects it to the surface; to provide such a device and method in which errors in the orientation of the beam deflector are compensated; and to provide such a device and method in which the beam is caused to sweep in succession along generally parallel off-set paths on the surface, thereby producing raster scanning of the surface.

Other objects and advantages of the invention will be apparent from the following description the accompanying drawings and the appended claims.

BRIEF DESCRIPTION OF THE DRAWINGS

FIG. 5 is a sectional view of a second embodiment of the scanning device of the present invention taken along a central axis similar to FIG. 1.

DETAILED DESCRIPTION OF THE PREFERRED EMBODIMENT

Figure 1:
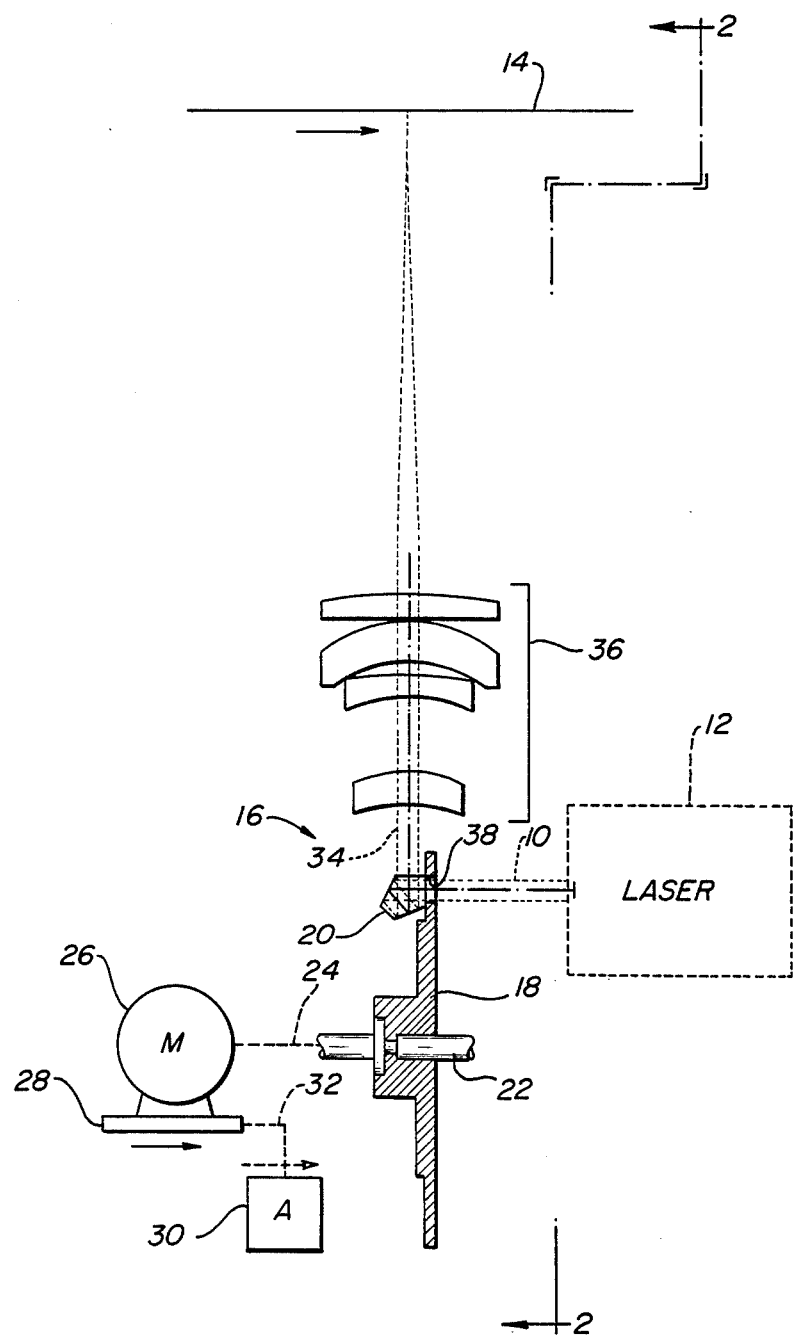
FIG. 1 is a sectional view of a first embodiment of the scanning device of the present invention taken generally along line 1—1 in FIG. 2.
Figure 2:
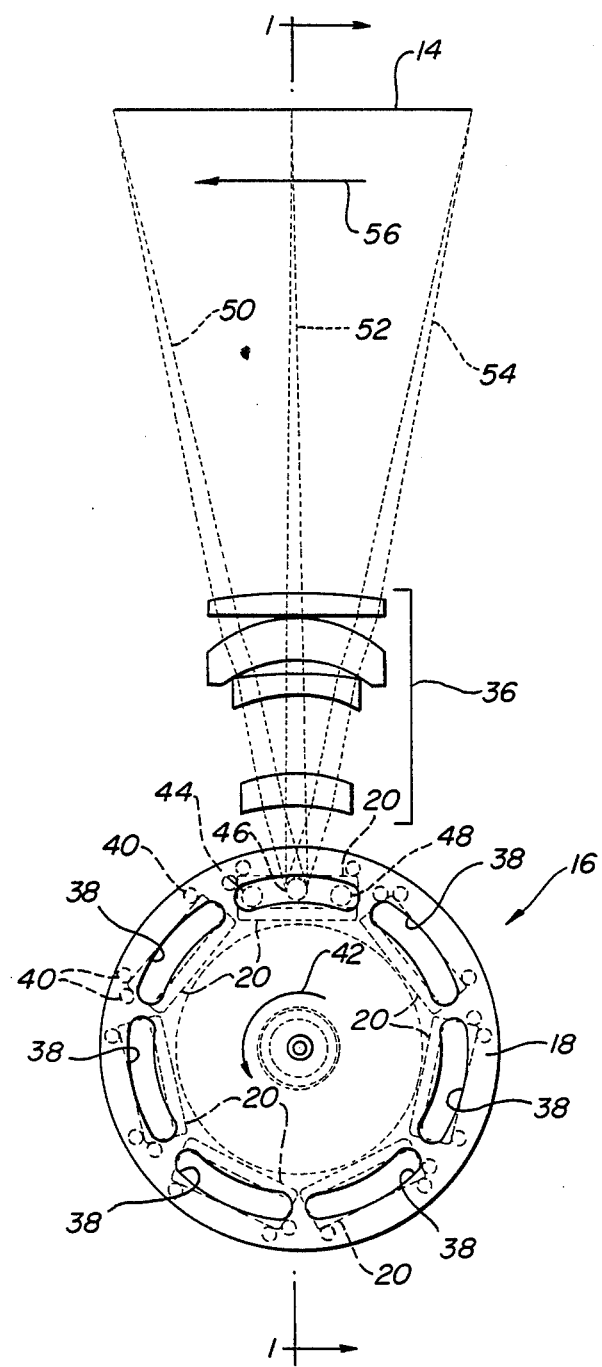
FIG. 2 is a side view of the device of the present invention, taken generally along line 2—2 in FIG. 1.

FIGS. 1 and 2 of the drawings illustrate a scanning device according to a first embodiment of the present invention for causing a beam of light 10 from a laser 12 to be repetitively swept across a surface 14. Surface 14 is normal to the plane of the drawings in FIGS. 1 and 2. A pentaprism assembly means 16 for redirecting the beam of light 10 to the surface 14 includes a support member 18 and a plurality of pentaprism elements 20 which are spaced around the periphery of the support member 18.

The support member 18 and shaft 22 are rotated about an axis, which is generally parallel to, but not aligned with, the beam of light 10. Shaft 22 is supported by appropriate bearing supports (not shown) and connected by drive linkage 24 to a drive motor 26, which may preferably be an electric motor. Motor 26 and the bearing supports for shaft 22 are mounted on platform 28. An actuator 30, which may preferably take the form an electric stepper motor, is connected by means of a linkage 32 to the platform 28 such that the platform, motor 26, drive linkage 24, shaft 22, and support member 18 may be moved linearly in a direction generally parallel to the surface 14.

As shown in FIG. 1, the beam of light 10 from laser 12 is redirected as beam 34 by the pentaprism element 20, and then passes through a lens means 36 which focuses beam 34 on the surface 14. Preferably, the surface 14 is a planar surface, and the lens means 36 comprises a multiple element F-theta lens arrangement. Alternatively, the lens means 36 may be a simple focusing lens if the surface 14 is curved about an axis coinciding generally with shaft 22.

As is generally known, a pentaprism has the unique and desirable property of diverting a beam of light at a constant angle, such as for example 90°, regardless of small changes in the orientation of the pentaprism. The present invention takes advantage of the light diverting properties of pentaprism elements, and rotates a plurality of such elements about an axis which is offset with respect to the beam of light and with respect to the pentaprism elements. Each of the pentaprism elements is caused to intersect the beam 10 during a portion of each rotation of the support member 18. While a pentaprism element is intersecting the beam, the pentaprism element causes the beam 34 to sweep across the surface 14.

As seen in FIGS. 1 and 2 each of the pentaprisms 20 is secured in position on the periphery of the support member 18 over one of the openings 38 so as to permit each pentaprism element 20 to intercept the beam 10 during a significant portion of the rotational cycle of the support member 18. Preferably, the pentaprism elements 20 may be adhesively secured to the support member 18. Elements 20 are aligned on member 18 by means of pins 40 which contact the sides of the elements. Preferably, the pentaprism elements 20 may be cut from a single, elongated prism so as to produce a set of pentaprism elements which have virtually identical reflection angle properties.

Figure 3A:
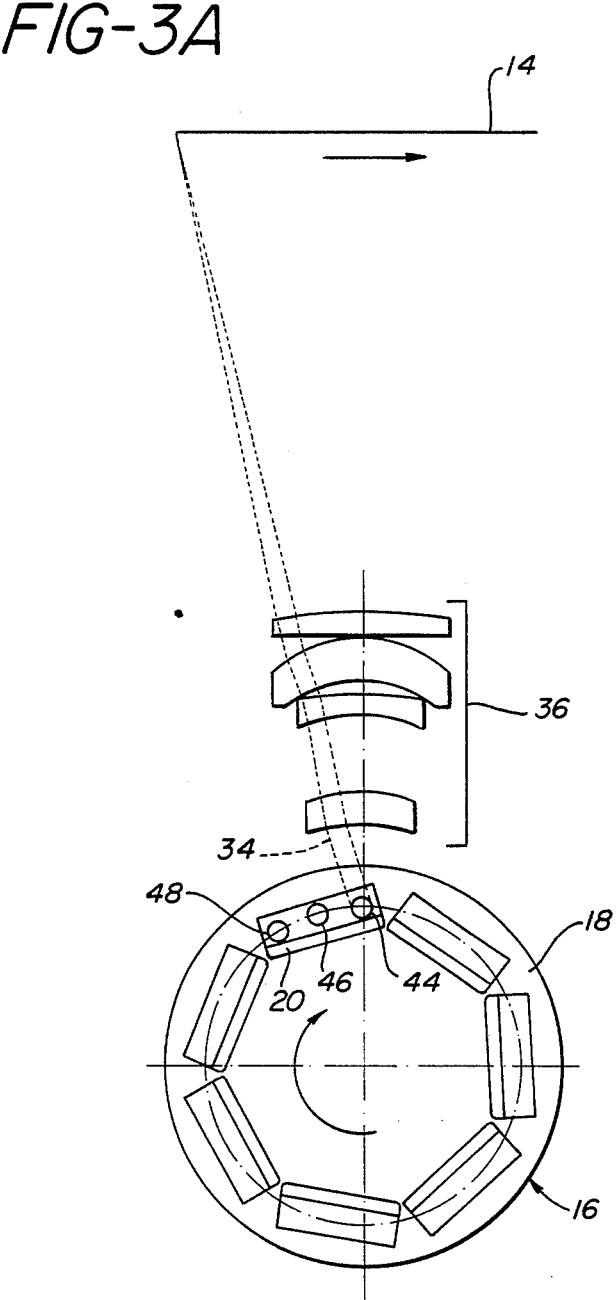
FIGS. 3A, 3B, and 3C are diagrammatic views of the device, as seen looking generally left to right in FIG. 1, illustrating movement of the beam.
Figure 3B:
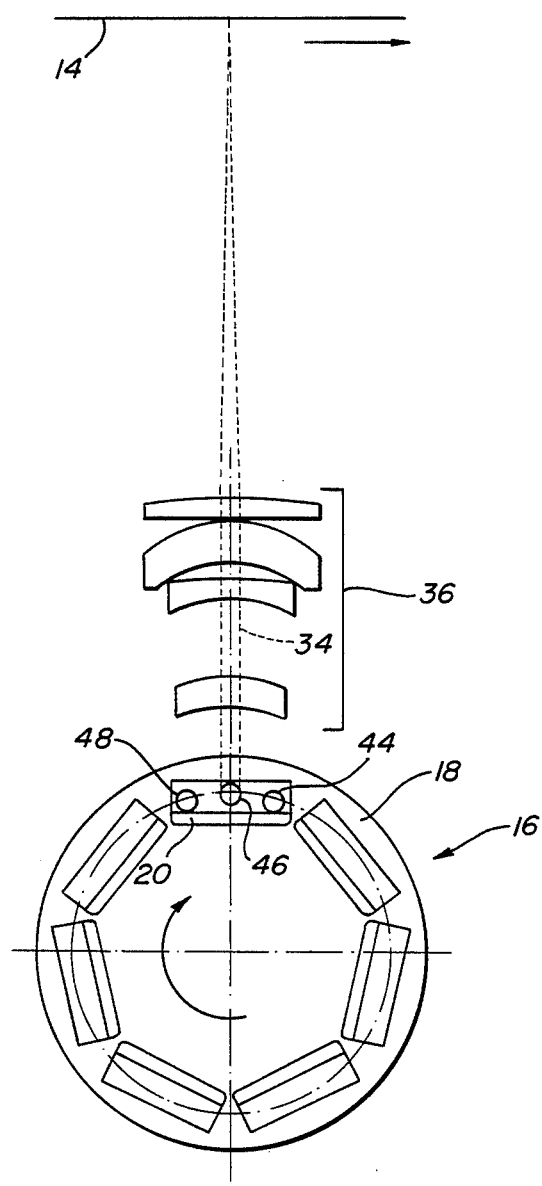
Figure 3C:
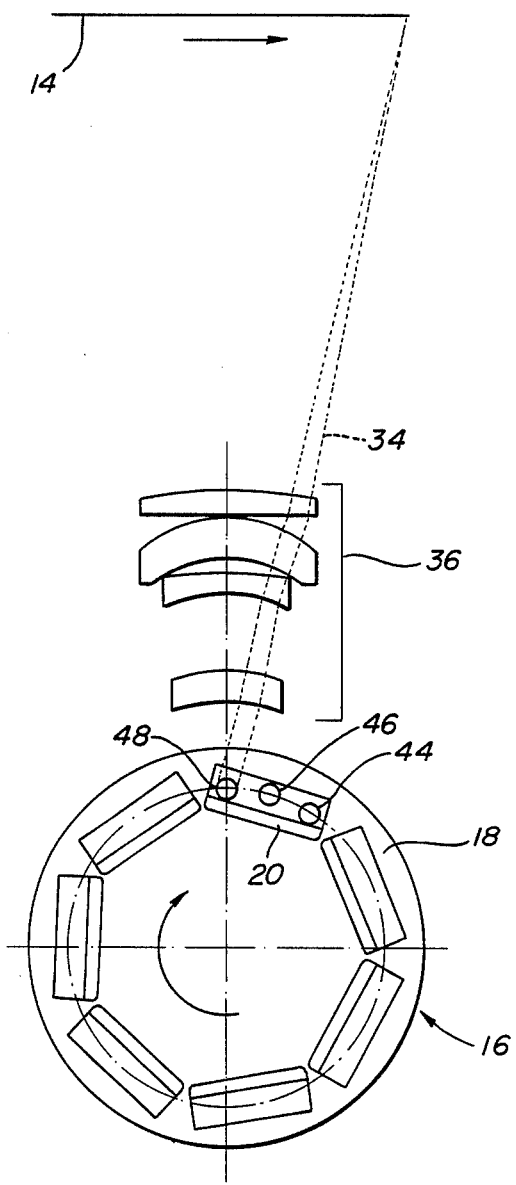

With the support member 18 rotating in the direction indicated by arrow 42, pentaprism element 20 illustrated at the top of member 18 in FIG. 2 initially intersects the beam 10 generally in the area indicated at 44 and, as the member 18 rotates, intersects the beam 10 in the central area indicated at 46 and ultimately in the area at 48 at the opposite end of the element 20. The beam paths for beam 34 are indicated at 50, 52, and 54 for intersections in areas 44, 46, and 48 respectively. As a consequence, the beam of light, focused by lens 36, sweeps across the surface 14 in the direction indicated by arrow 56. This movement of the beam 34 is illustrated somewhat schematically in FIGS. 3A, 3B, and 3C, which are views of the pentaprism assembly means 16 as seen from the side opposite that shown in FIG. 2.

Figure 4A:
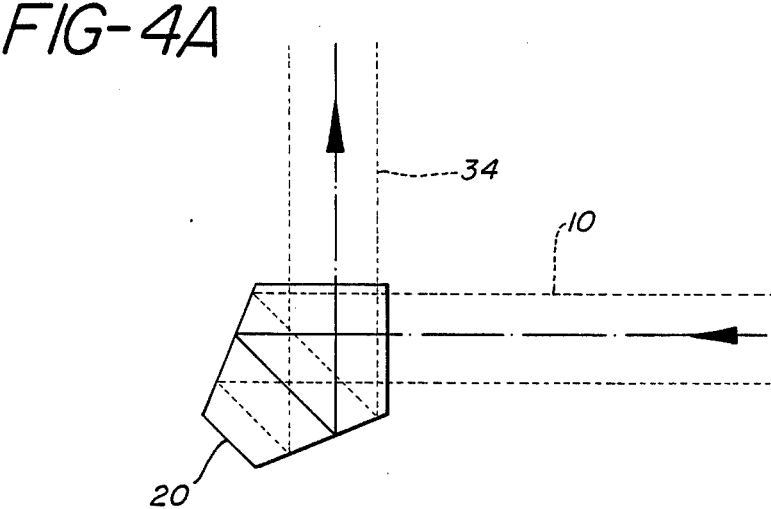
FIGS. 4A and 4B are enlarged views of a pentaprism element, as seen from the vantage of FIG. 1, illustrating a shift in the beam position from the initial point of interception of the beam by one end of the element (FIG. 4A) to the interception of the beam by the middle of the element (FIG. 4B)
Figure 4B:
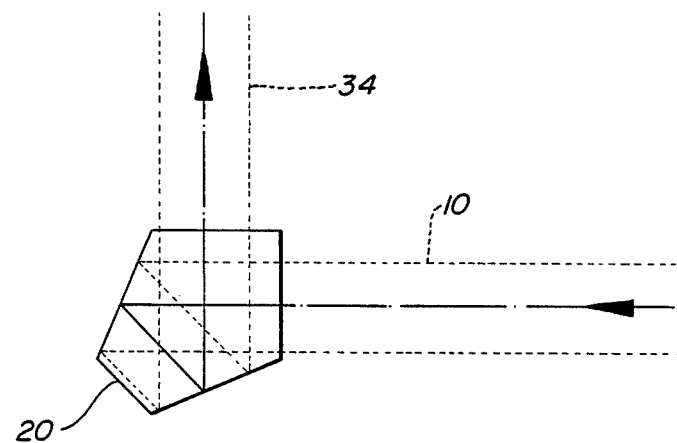

It should be noted that beam 10 strikes each pentaprism element 20 at a relatively lower point on the pentaprism element near the ends of the element than near its mid-point. Areas 44 and 48 are thus relatively lower than area 46 on the pentaprism element 20. Although the angle of reflection of the beam 10 by the pentaprism element 20 is unaffected by the area on the pentaprism element which intercepts the beam, this relative vertical shift in the beam 10 does produce a lateral shift in the reflected beam 34. This may be seen by comparing FIG. 4A (corresponding to the beam 10 striking the prism 20 generally in the area 46) with FIG. 4B (corresponding to beam 10 striking the pentaprism 20 in the areas 44 and 48 adjacent the ends of the pentaprism element). The reflector beam 34 is shifted to the left as the relative position of the beam 10 is lowered. Since the rays from laser source 12 are collimated and therefore parallel, the rays making up reflected beam 34 are parallel and will be focused on the surface 14 at the desired location by the lens 36. The location of the focus will not be affected by the lateral shift of beam 34 shown in FIGS. 4A and 4B. It should be noted, however, that if the focusing lens arrangement were to be positioned between the laser source 12 and the pentaprism assembly means 16, a slightly bowed scan line would be traced across the surface 14 by the beam 34, since the lateral shift of beam 34 shown in FIGS. 4A and 4B would not be compensated.

The shifting of the pentaprism assembly means 16 by actuator 30 results in each scan line which is swept across surface 14 by the beam of light to be slightly off-set with respect to the previous scan line.

The scan lines on surface 14 are generally perpendicular to the plane of FIG. 1 and parallel to the plane of FIG. 2. The scan lines are spaced apart by a distance controlled by the amount of relative movement provided by actuator 30. The platform 28 may be moved in a step-wise fashion between each sweep of the beam 34 so as to produce a series of parallel scan lines which are normal to the direction of movement of the platform 28. Alternatively, platform 28 may be moved in a continuous fashion, producing a series of scan lines which are skewed slightly with respect to the direction of movement of the platform 28. It will be appreciated that by using a plurality of pentaprisms mounted for rotation about an axis not aligned with the pentaprisms, the device of the present invention is able to provide high precision scanning of a beam of light across a surface in a series of generally parallel, precisely positioned scan lines.

FIG. 5 of the drawings illustrates a second embodiment of the present invention which is particularly useful in aerial and satellite reconnaissance. The device is shown in an inverted orientation for consistency with and ease of comparison to FIGS. 1-4. This embodiment is different from the first embodiment in that it is passive, that is, it does not direct a beam of light toward surface 58, but rather simply receives ambient light which is reflected from surface 58. Typically this embodiment is carried in an aircraft to scan the surface 58 of the earth which is far below. As a result of this large separation between the surface 58 and the scanning device, the light 60 received from the area 62 on the ground is essentially collimated. Preferably, the scanning device is oriented as shown in FIG. 5, with respect to the direction of movement of the aircraft, such direction being indicated by arrow 64.

The device includes a detector means 66 for providing an electrical signal in response to light incident thereon. Detector means may be of relatively simple construction, comprising a photodector (not shown) which receives light 68 through a pin hole. Other photodetection arrangements may be utilized if desired, however.

The device further includes pentaprism assembly means 70 for receiving substantially collimated light 60 from an area 62 on the distant surface 58 and redirecting the collimated light to the detector means 66. The pentaprism assembly means 70 includes a support member 72 and a plurality of pentaprism elements 74 positioned around the periphery of the support member 72. The pentaprism assembly means 70 is substantially the same as pentaprism assembly means 16. A means for rotating the support member 72 such as motor 76 is provided such that successive ones of the plurality of pentaprism elements 74 are brought into optical alignment with detector means 66. Thus the pentaprism elements redirect the collimated light 60 to the detector means 66, whereby movement of each pentaprism element 74 while aligned with the detector means 66 causes the area 62 to sweep across the surface 58. The size of the area 62 will depend on the spacing between the scanner device and the surface 58 and on the field of view of the detector.

The pentaprism elements 74 are mounted on the support member 72 so as to redirect the collimated light 60 in a direction generally parallel to the axis of rotation of the support member 72, whereby movement of each pentaprism element 74 causes the area 62 to sweep along a path on the surface which is generally normal to the plane of FIG. 5. As stated previously, this device is advantageously used for aerial scanning. As a consequence, the aircraft which carries the device constitutes the means for moving the pentaprism assembly means 70, as well as motor 76 and detector 66, in the direction indicated by arrow 64, generally parallel with the surface 58 and with the axis of rotation of shaft 78. The movement of successive pentaprism elements 74 into alignment with the detector means 66 causes the area 62 to sweep in succession along generally parallel, off-set paths on the surface 58, thereby producing raster scanning of the surface.

Having described the invention in detail and by reference to preferred embodiments thereof, it will be apparent that modifications and variations are possible without departing from the scope of the invention defined in the appended claims. For example, a scanning device according to the present invention may incorporate both a light source which is swept across a surface and a detector which receives light reflected from the surface.

What is claimed is:

1. A scanning device for causing a beam of light to be repetitively swept across a surface, comprising:
   means for providing a beam of light,
   pentaprism assembly means for redirecting said beam of light to said surface, said pentaprism assembly means including a support member and a plurality of pentaprism elements positioned around the periphery of said support member,
   means for rotating said support member such that successive ones of said plurality of pentaprism elements are brought into the path of said beam of light and redirect said beam of light to said surface, whereby movement of each pentaprism element while intersecting said beam of light causes said beam of light to sweep across said surface.

2. The scanning device of claim 1 in which said means for providing a beam of light comprises a laser source.

3. The scanning device of claim 1 in which said means for rotating said support member comprises means for rotating said support member about an axis which is generally parallel to, but not aligned with, said beam of light.

4. The scanning device of claim 3 in which said pentaprism elements are mounted on said support member so as to redirect said beam of light outward, in a direction generally perpendicular to the axis of rotation of said support member, whereby movement of each pentaprism element through the path of the beam causes the beam to strike said surface and sweep along a path on said surface.

5. The scanning device of claim 4, further comprising means for moving said pentaprism assembly means in a direction generally parallel with said surface, whereby the movement of successive pentaprism elements through the path of the beam causes the beam to sweep in succession along generally parallel, off-set paths on said surface, thereby producing raster scanning of said surface by said beam in a raster format.

6. The scanning device of claim 4 in which each pentaprism element is elongated and mounted on said support member periphery so as to intersect said beam during a portion of each revolution of the support member.

7. The scanning device of claim 1 further comprising lens means for focusing light, redirected by said pentaprism elements, on said surface.

8. The scanning device of claim 7 in which said surface is a planar surface and in which said lens means comprises a multiple element F-theta lens arrangement.

9. A scanning system for causing a beam of light to strike a surface and sweep in succession along a plurality of generally parallel, off-set scan lines, comprising:
   a light source for providing a beam of light,
   a plurality of pentaprism elements.
   support means having an axis rotation, for supporting said pentaprism elements, said pentaprism elements being positioned generally in a circle about said axis, and
   means for rotating said support means such that each pentaprism element in turn is struck by said beam of light and diverts said beam of light to said surface, movement of each pentaprism element during the time that it is struck by said beam causing said beam to sweep along one of said scan lines.

10. The scanning system of claim 9 in which said surface is substantially planar and in which said system further includes lens means for focusing said beam of light on said surface.

11. The scanning system of claim 10 in which said lens means comprises an F-theta lens positioned in the path of said beam for focusing said beam after said beam is redirected by said pentaprism elements.

12. The scanning system of claim 9 further comprising means for providing relative movement between said surface and said support means such that successive, off-set scan lines are scanned by said beam during redirection of said beam by successive pentaprism elements.

13. The scanning system of claim 12 in which said relative movement is generally parallel to said axis of rotation.

14. The scanning system of claim 13 in which said axis of rotation is generally parallel to the beam of light emerging from said light source, but off-set with respect thereto.

15. A scanning method, for directing a beam of light to a surface, comprising the steps of:
   providing a beam of light, and
   rotating at least one pentaprism element about an axis which is not aligned with said pentaprism element, such that said pentaprism element intercepts said beam during a portion of each rotation thereof and redirects said beam to scan across said surface.

16. The scanning method of claim 15 further comprising the step of focusing said beam on said surface after redirection by said pentaprism element.

17. The scanning method of claim 15 in which the step of rotating includes the step of rotating said pentaprism element about an axis generally parallel with said surface.

18. The scanning method of claim 17 in which the step of providing a beam of light includes the step of providing a beam of light which is generally parallel to said surface.

19. The scanning method of claim 15 in which the step of rotating includes the step of rotating a plurality of pentaprism elements about an axis which is not aligned with said pentaprism element and from which said elements are spaced by substantially equal distances.

20. The scanning method of claim 15 in which the step of providing a beam of light includes the step of providing a collimated beam of coherent light.

21. A scanning device for receiving light from an area on a distant surface, which area is repetitively swept across the surface, comprising:
   detector means for providing an electrical signal in response to light incident thereon,
   pentaprism assembly means for receiving substantially collimated light from an area on a distant surface and redirecting said collimated light to said detector means, said pentaprism assembly means including a support member and a plurality of pentaprism elements positioned around the periphery of said support member, and
   means for rotating said support member such that successive ones of said plurality of pentaprism elements are brought into optical alignment with detector means so as to redirect said collimated light to said detector means, whereby movement of each pentaprism element while aligned with said detector means causes said area to sweep across said surface.

22. The scanning device of claim 21 in which said pentaprism elements are mounted on said support member so as to redirect said collimated light in a direction generally parallel to the axis of rotation of said support member, whereby movement of each pentaprism element causes the area to sweep along a path on said surface.

23. The scanning device of claim 22 further comprising means for moving said pentaprism assembly means in a direction generally parallel with said surface, whereby the movement of successive pentaprism elements into alignment with said detector means causes the area to sweep in succession along generally parallel, off-set paths on said surface, thereby producing raster scanning of said surface.

24. The scanning device of claim 22 in which each pentaprism element is elongated and mounted on said support member periphery so as to align with said detector means during a portion of each revolution of the support member.

* * * * *